US006560770B1

United States Patent
Saxena et al.

(12) United States Patent
(10) Patent No.: US 6,560,770 B1
(45) Date of Patent: May 6, 2003

(54) EXTENDING THE ATTRIBUTES OF AN APPLICATION GENERATED USING A FOURTH GENERATION PROGRAMMING TOOL

(75) Inventors: Sanjay Saxena, Fremont, CA (US); Christopher J. Harrison, Les Moulis (FR)

(73) Assignee: Oracle Corporation, Redwood Shores, CA (US)

( * ) Notice: Subject to any disclaimer, the term of this patent is extended or adjusted under 35 U.S.C. 154(b) by 0 days.

(21) Appl. No.: 09/318,518

(22) Filed: May 25, 1999

(51) Int. Cl.$^7$ ................................................. G06F 9/44
(52) U.S. Cl. ....................... 717/107; 717/108; 717/111; 717/116; 709/203
(58) Field of Search ..................... 717/1, 2, 3, 106–116; 709/203

(56) References Cited

U.S. PATENT DOCUMENTS

| | | | | |
|---|---|---|---|---|
| 5,721,929 A | * | 2/1998 | Pasquariello | 717/116 |
| 5,911,070 A | * | 6/1999 | Solton et al. | 395/701 |
| 5,960,200 A | * | 9/1999 | Eager et al. | 717/102 |
| 6,167,563 A | * | 12/2000 | Fontana et al. | 717/1 |
| 6,237,135 B1 | * | 5/2001 | Timbol | 717/1 |

OTHER PUBLICATIONS

Mancini, L. V., "A technique for subclassing and its implementation exploiting polymorphic procedures" Software Practice & Experience, John Wiley & Sons Ltd. Chichester, GB, vol. 18, No. 4, Apr. 1988 (Apr. 1998), pp. 287–300, XP002114375 ISSN: 0038–0644. p. 294, line 9—p. 298, line 34.

Baumgartner G., et al.: "Signatures: A Language Extension for Improving Type Abstraction and Subtype Polymorphism in C++", Software Practice and Experience, GB, John Wiley & Sons Ltd. Chichester, vol. 25, No. 8, Aug. 1, 1995 (Aug. 1, 1995), pp. 863–889, XP000655527 ISSN: 0038–0644, p. 870, line 37—p. 872, line 9.

* cited by examiner

*Primary Examiner*—Kakali Chaki
*Assistant Examiner*—Chuck Kendall
(74) *Attorney, Agent, or Firm*—Hickman Palermo Truong & Becker LLP; Brian D. Hickman; Cheryl A. Eichstaedt (57) ABSTRACT

A method and apparatus are provided for extending the behavior and attributes of applications designed using a fourth generation language (4GL) programming tool. Specifically, a 4GL programming tool is provided that allows application designers to specify the implementation classes of the components that are used in the applications that they design using the 4GL programming tool. The implementation classes thus specified may define attributes and behaviors not supported by the corresponding component implementations provided with the 4GL programming tool. During runtime, methods in the specified implementation classes are invoked. To correctly invoke the methods of user-specified implementation classes, the interfaces of the methods must be known to the entity performing the invocations. Therefore, according to one aspect of the invention, all component implementations that are to be used by the application, including both the "standard" component implementations provided with the 4GL programming tool and the "custom" component implementations specified by the application designer, implement a common interface.

24 Claims, 2 Drawing Sheets

EXTENDING THE ATTRIBUTES OF AN APPLICATION GENERATED USING A FOURTH GENERATION PROGRAMMING TOOL

FIELD OF THE INVENTION

The present invention relates to computer systems and, more specifically, to extending the attributes of an application generated using a fourth generation programming tool.

BACKGROUND OF THE INVENTION

While computers themselves have automated many tasks that had previously been performed manually, it has only been fairly recently that the task of programming the computer has achieved some level of automation. Early computer programming languages required the programmer to manually enter all of the code of an application, usually by typing source code in a text file. While such manual code entry was tedious and error prone, it did have the advantage that virtually all aspects of the resulting applications were entirely under the control of the programmer. Programmers could modify their programs however they saw fit by simply modifying the underlying code.

Over time, techniques have been developed to automate the creation of applications. In particular, tools have been developed to allow users to design applications, and to automatically generate code that implements those applications, simply by interacting with user interface controls. Such tools are generally referred to as fourth generation (4GL) programming tools.

For example, a 4GL programming tool may present an application designer with a window that represents the interface that the to-be-generated application will display to its users. The 4GL programming tool may further present the application designer with user interface design tools that allow the application designer to visually "paint" standard user interface components onto the window. For example, the user interface design tools may allow the application designer to place check boxes, menus, dialog boxes, list boxes, and buttons onto the window, and allow the application designer to specify what should happen when the user interacts with those components.

The user may view a "property palette" for each user interface component that the user has placed on the window. The property palette lists the properties of the user interface component that can be specified by the user, and the current value of those properties. For example, a property for a button component may be "label", where the value assigned to the label property is the text that is displayed on the button.

Once the application designer has finished designing the application, the 4GL programming tool automatically generates code for the application. The form of the code thus generated may vary from implementation to implementation. For example, the 4GL programming tool may generate machine-executable code, source code, and/or metadata. For the purpose of explanation, the term "application code" shall be used herein to refer to the data generated by a 4GL programming tool to specify the applications designed using the 4GL programming tool, regardless of the form of that data.

Frequently, the 4GL programming tool is used to generate application code that is not directly executable by a computer, but which, when executed by a particular runtime engine, implements the application that was designed using the 4GL programming tool. For example, the runtime engine reads the application code generated by the 4GL programming tool, and "executes" the application code by displaying the window previously designed by the application designer, along with all of the user interface components that were added to the window by the application designer. When the user interacts with those user interface components, the application performs the actions that the application programmer assigned to those components using the 4GL programming tool.

4GL programming tools make designing applications far easier and faster, and less error prone, than manual coding techniques. However, the ease and speed gained by 4GL programming is not without its price. In particular, the virtually unrestrained flexibility and control provided by manual coding is lost. Instead, the 4GL programming tool user is typically presented with a "canned" set of standard user-interface components. The code that actually implements those components is typically contained in a compiled library that is distributed with the 4GL programming tool, and are thus generally inaccessible to the user. Consequently, the user is limited to (1) the set of components offered by the 4GL programming tool, (2) the properties provided by those components, and (3) the functions performed by the methods provided for those components. Even slight deviations from the norm, such as presenting an oval button instead of a rectangular button, are not possible if the components provided by the 4GL programming tool do not have user-settable properties that allow the deviations. For example, for a 4GL programmer to use oval buttons, the button component provided by the 4GL programming tool would have to provide a "shape" property that may be changed from "rectangle" to "oval". If the button component does not have a "shape" property, or if "oval" is not a value supported for the shape property, then the user cannot design applications that have oval buttons.

The attributes and behaviors of the user interface (UI) and software components that a 4GL programmer may incorporate in an application are implemented in object classes supplied in a library that is provided with the 4GL programming tool. The library is typically supplied in compiled form, so that it is not editable. When the user designs an application that uses a button, for example, the 4GL programming tool generates code which, when executed by the runtime engine, results in calls being made to methods within the "button" class in the library provided with the 4GL programming tool. If the "display" method of the button class is designed to display a rectangular button, then a rectangular button will be displayed, even if the designer would prefer an oval button.

Based on the foregoing, it is clearly desirable to provide a method and system that allows applications to be designed easily and quickly using 4GL programming tools, but which allows greater flexibility than current 4GL programming tools. In particular, it is desirable to provide a 4GL programming tool that does not restrict users to only those implementations of components that are supplied with the 4GL programming tool.

SUMMARY OF THE INVENTION

According to one aspect of the invention, a 4GL programming tool is provided that allows application designers to specify the implementation classes of the components that are used in the applications that they design using the 4GL programming tool. The implementation classes thus specified may define attributes and behaviors not supported by the corresponding component implementations provided with the 4GL programming tool. During runtime, methods in the specified implementation classes are invoked. To correctly invoke the methods of user-specified implementation classes, the interfaces of the methods must be known to the entity performing the invocations. Therefore, according to one aspect of the invention, all component implementations that are to be used by the application, including both the "standard" component implementations provided with the 4GL programming tool and the "custom" component implementations specified by the application designer, implement a common interface.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus are described for extending the attributes of an application generated using a 4GL programming tool. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

FUNCTIONAL OVERVIEW

A 4GL programming tool is provided that, similar to conventional 4GL programming tools, allows users to design applications without manually typing the code for the applications. According to one embodiment, users use the 4GL programming tool to design applications visually by selecting user interface components, placing the selected user interface components into a window, and specifying property values for those components. However, unlike conventional 4GL programming tools, one component property that is controlled by the application designer is the implementation class of the component. The value to which the application designer sets the implementation class property of a component dictates the object class that defines the properties and methods that will be executed at runtime to implement the component. The specified implementation class for a button may be, for example, the standard button class provided by the 4GL programming tool, or a custom designed oval button class written by the application designer or by a third party component developer.

During runtime, methods in the specified implementation class are invoked to instantiate the component and to set and read properties of the component. To correctly invoke those methods, the interfaces of the methods must be known to the entity performing the invocations. Therefore, according to one aspect of the invention, each of component implementations that are to be used by the application, including both the "standard" component implementations in the library provided with the 4GL programming tool and the "custom" component implementations specified by the application designer, implements a common interface.

EXEMPLARY 4GL SYSTEM

Figure 1:
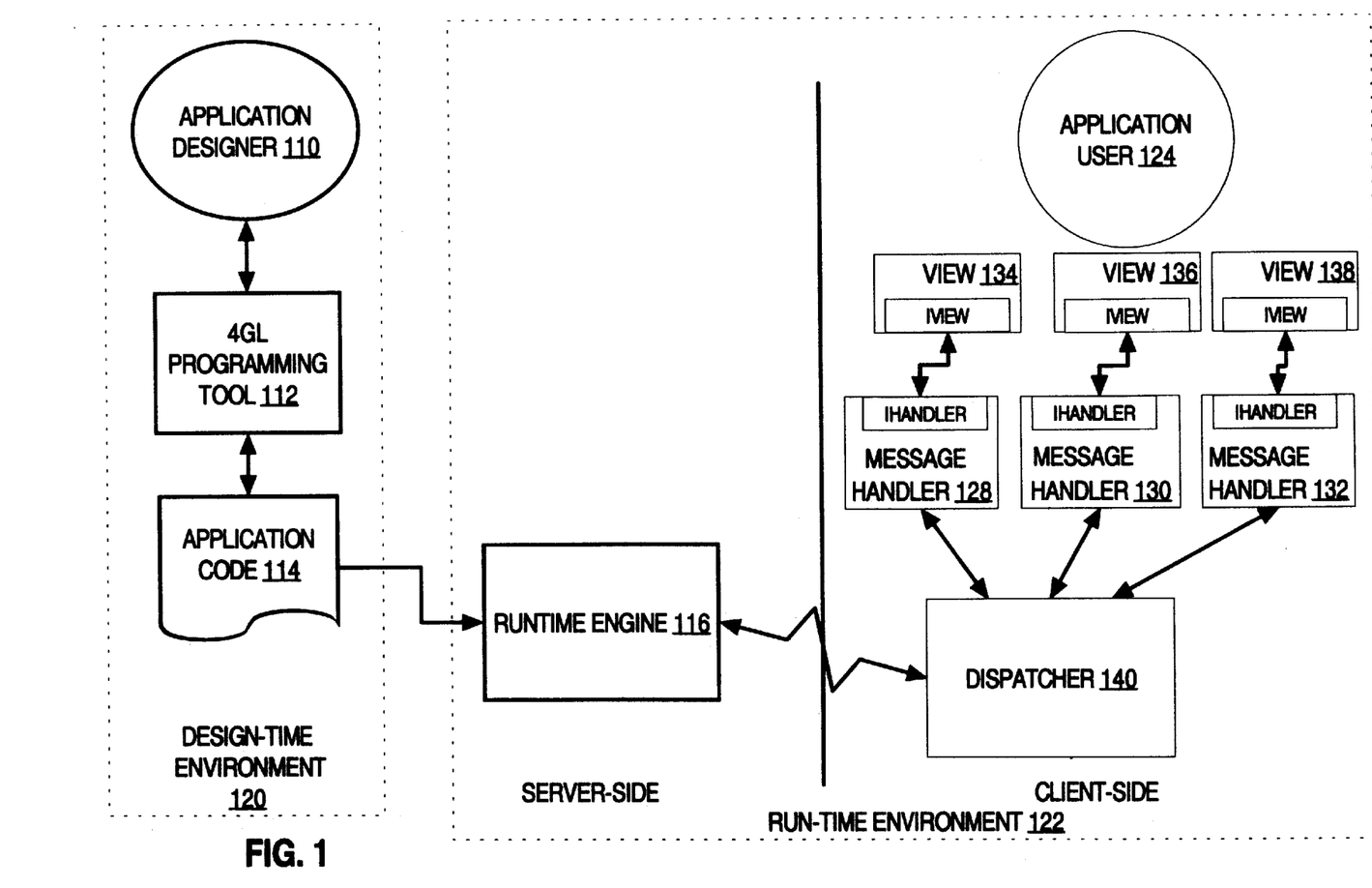
FIG. 1 is a block diagram of a 4GL application development system that supports the use of user-specified component implementations according to an embodiment of the invention.

FIG. 1 illustrates a 4GL system 100 according to an embodiment of the invention. The 4GL system 100 includes a 4GL programming tool 112 that an application designer 110 uses to generate application code 114 that defines an application program. As mentioned above, the application code 114 may be in a form that is directly executable by a machine, may be in a form that is executable by a virtual machine, or may simply be metadata that describes the application. In the illustrated embodiment, the application code 114 is in a form that is used by a runtime engine 116 to implement the invention.

At run-time, the application code 114 is "executed" by a runtime engine 116. Depending on the nature of the application code 114, the process of executing the application code 114 may, for example, involve interpreting instructions contained in the application code 114 or calling routines that implement application components that are described in the application code 114.

In the illustrated system 100, the application is implemented in a client/server model, where portions of the application run on a server, and other portions of the application run on a client. Typically, the server-side components are on a different machine than the client-side components, and communication between the two sets of components is performed over a network connection.

The server-side components of the application include the application code 114 and the runtime engine 116. The client-side components of the application include components that implement the user interface of the application that is displayed to an application user 124. Those components include a dispatcher 140, message handlers, and views. The illustrated embodiment is shown with three message handlers 128, 130 and 132 and three views 134, 136 and 138.

Each component of the application's user interface has a corresponding view and message handler. For example, assume that the user interface of the application includes a button B1 and two checkboxes CB1 and CB2. View 134 and message handler 128 may correspond to the button B1, view 136 and message handler 130 may correspond to the first check box CB1, and view 138 and handler 132 may correspond to the second check box CB2.

A view is an instance of the implementation class of a component. Thus, the view that corresponds to a component includes the code that implements the component. For example, view 134 is an instance of the implementation class that implements button B1. Similarly, views 136 and 138 are instances of the implementation classes that implement check boxes CB1 and CB2, respectively. The views 136 and 138 for check boxes CB1 and CB2 will not contain the same code if, for example, CB1 is implemented using the default check box implementation class, while CB2 is implemented using a user-specified check box implementation class. Under those conditions, the code implementing CB1 would typically be contained in a runtime library distributed with 4GL programming tool 112, while the code implementing CB2 would be implemented in a separate file.

Each type of component has a corresponding type of message handler. The message handler type for a given component type is designed to handle the type of messages associated with that component type. For example, a button message handler listens for and handles the type of messages buttons receive, while a check box message handler listens for and handles the type of messages check boxes receive.

The message handler that corresponds to a component sends messages relating to events involving the component back to the runtime engine 116. For example, message handler 128 may detect that the user has clicked on button B1. In response to detecting the click, the message handler 128 sends a message through dispatcher 140 to runtime engine 116, making the runtime engine 116 aware that button B1 has been clicked.

The message handler that corresponds to a component also invokes methods provided by the component's view in response to messages from the runtime engine 116. For example, message handler 128 may respond to a message from runtime engine 116 by calling a method provided by view 134 that changes the color of button B1.

OPERATION OF RUN-TIME ENVIRONMENT

At runtime, the runtime engine 116 reads and executes the application code 114 that was previously generated by the 4GL programming tool 112. That application code 114 includes data that identifies the implementation class of the application components for which the application designer 110 specified an implementation class. For example, assume that the default implementation class for buttons is DefButton.class. During application design, the application designer 110 may have specified a different implementation class for the B1 button that is to be displayed on the user interface of the application. For the purpose of explanation, it shall be assumed that the application designer 110 specified the implementation class of button B1 to be MyButton.class. Under these conditions, the application code 114 includes data that indicates that the implementation class of B1 is MyButton.class.

During execution of the application code 114, the runtime engine 116 sends messages to the dispatcher 140 to cause the creation of the components specified in the application code 114. For at least those components that do not use the default class implementations, the messages sent by runtime engine 116 include information that identifies the implementation class. For example, it shall be assumed that runtime engine 116 sends a message to dispatcher 140 that requests the creation of button B1 using implementation class MyButton.class.

When dispatcher 140 receives a message from runtime engine 116, dispatcher 140 forwards the message to the message handler that corresponds to the component identified in the message. If a message handler has not yet been initiated for the component identified in the message, then the dispatcher 140 instantiates a message handler of the appropriate component type for the component. For example, if the message received by dispatcher 140 calls for the creation of a button (e.g. button B1), and a message handler for that particular button has not been instantiated, then dispatcher 140 instantiates a button-type message handler (e.g. message handler 128) for the button. After instantiating the appropriate message handler, the dispatcher 140 sends the message to message handler.

When a message handler receives a message to create a component, the message handler determines, based on information contained in the message, whether the component is implemented using the default class implementation. If the component is implemented using the default class implementation, then the message handler calls the method that instantiates components (i.e. the "constructor") provided by the default class implementation for that type of component. This is typically performed by calling a method in the runtime library provided with 4GL programming tool 112. If the component is implemented using a user-specified class implementation, then the message handler calls the constructor provided by the user-specified class implementation.

For example, in response to a message requesting the instantiation of button B1, message handler 128 determines that button B1 is implemented using the user-specified implementation class MyButton.class. Message handler 128 would therefore call the constructor provided by the MyButton.class implementation class to instantiate button B1. Instantiating button B1 creates an instance of the class MyButton, which is depicted as view 134.

Once a client-side component has been instantiated, the properties of the component must be set to the values specified for the component by the application designer 110. The values for the properties of the component are reflected in the application code 114 generated by the 4GL programming tool 112. After causing the component to be instantiated, the runtime engine 116 sends messages to dispatcher 140 that indicate the values of the properties of the component. Dispatcher 140 forwards those messages to the message handler that corresponds to the component, and the message handler invokes the appropriate method of the component's view to set the specified property to the specified value.

For example, assume that application designer 110 assigned the value "OK" to the "Label" property of button B1. Under these conditions, the application code 114 generated by 4GL programming tool 112 would indicate that the Label property of button B1 has been assigned the value "OK". At runtime, after causing button B1 to be instantiated, runtime engine 116 sends a message to dispatcher 140 that indicates that the Label property of button B1 should be set to "OK". Dispatcher 140 forwards this message to message handler 128, which invokes the appropriate routine of view 134 to cause the Label property of button B1 to be set to "OK". According to one embodiment, this process is repeated for each property of button B1 for which a value was specified during design-time.

Significantly, the actual operation performed by view 134 in response to a property being set to a value may be completely different than the operation performed by an instance of the default button class in response to the same property being set to the same value. For example, the default button class DefButton may cause the text "OK" to be on the face of a rectangular button in response to the Label property of the button being set to "OK". In contrast, button B1, implemented by user-specified button class MyButton, may cause the button to be in the shape of the letters "OK" in response to the Label property being set to "OK".

During execution of the application, runtime engine 116 may require the current value of a property of a UI component. To determine the value, runtime engine 116 sends to dispatcher 140 a message that identifies the component and specifies the property for which runtime engine 116 requires the current value. Dispatcher 140 forwards the message to the appropriate message handler, and the message handler responds by invoking the appropriate method of the view that corresponds to the specified component to retrieve the current value of the specified property. The message handler passes the retrieved value back to dispatcher 140, which sends the value in a message back to runtime engine 116.

COMMON INTERFACE

A 4GL programming tool typically provides, for each type of component made available to the application programmer, both (1) a class implementation for the component-type, and (2) a message handler that works with the class implementation. It is possible for 4GL programming tool makers to design message handlers to work with their particular class implementations because they are the providers of those class implementations, and therefore know and control the interfaces thereto.

As described above, embodiments of the present invention allow application designers to specify class implementations that are different than the ones provided by the 4GL programming tool makers. According to one embodiment, even when a user has specified a non-default class implementation for a component, the message handler provided by the 4GL programming tool for that type of component is able to work with the specified class implementation.

To properly function with user-specified component class implementations, message handlers must not only know the class file that contains class implementation of the component class, but also the interface of the methods implemented by the component classes. For example, to set the Label property of button B1, message handler 128 must know the interface of the method, within view 134, that sets the Label property value.

According to one embodiment, the message handlers know the interface of the methods implemented by user-specified component classes because all component class implementations, including both the default class implementations and user-specified class implementations, are designed to implement a common interface, referred to herein as the IView interface. The message handlers, in turn, are designed to make calls to views through the IView interface. Thus, even though it is not known, at the time that message handlers are designed, which class implementations the message handlers will have to work with, the message handlers are still able to function with whatever class implementations are specified by the application designer 110.

According to one embodiment, all user-specified class implementations are designed to support the following interface (IView):

public void init (IHandler handler);
    public void destroy( );
    public Object getProperty(PropertyID id);
    public boolean setProperty(PropertyID id, Object value);
    public void addListener(Class type, EvenListener listener);
    public void removeListener(Class type, EventListener listener);
    public void paint(Graphics g);
    public void repaint(Rectangle r);
    public void add(Object, child, int index);
    public void remove(Object child);
    public void removeAll( );

In the preceding interface, some methods include parameters of type IHandler. IHandler is a data type for storing a value that identifies a specific message handler instance. As mentioned above, the entity that makes calls to the methods in the IView interface is a message handler instance. Thus, for the methods that require an IHandler to be passed as an input variable, the message handler instance making the call typically passes data that identifies itself. According to one embodiment, for each component, the methods of the IView interface supplied by the class implementation for that component are invoked by the message handler for that component as follows:

The "init" method is called immediately after the component is constructed. The "init" method passes the component a reference to its message handler and gives the component a chance to perform any initialization that it requires.

The "destroy" method is called when a component is no longer required. This method gives the component a chance to free up any system resources that it holds.

The "getProperty" method returns the value of the requested property. According to one embodiment, all component implementations for a particular component type are designed to support certain properties. If the specified property is not supported by the component, this getProperty method returns Property.NOT_SUPPORTED.

The "setProperty" method sets the value of the specified property. If the specified property is not supported by the component, this method returns false, otherwise it returns true.

The "addListener" method adds a listener of the specified type. According to one embodiment, all component implementations for a particular component type are designed to support certain types of Listener.

The "removeListener" method removes a listener of the specified type.

In the "paint" method, the View must paint itself using the Graphics object specified in the parameter. According to one embodiment, components may include other components. A component that contains other components is referred to as a "Container". For components that are part of a Container, the "paint" method is called by the component's Container. For other components, the "paint" method is called by the component's message handler.

In the "repaint" method, the View invalidates the rectangle provided. If the rectangle is null, the entire object is invalidated.

The "add" method adds a child component to another component. For Containers, the child is of type IView, where IView is the class from which all Views are derived. For lists, the child is of type String. If the index is −1, the child is added at the end of the list. If the index is greater than the current number of children or less than −1, the method will fail.

The "remove" method removes a child from the specified IView. For Containers the child is of type IView. For lists the child is of type String.

The "removeAll method" removes all children from the specified IView.

When an application designer desires to use a class that does not support the IView interface, the application designer may simply define a subclass of that class, where the subclass does support the IView interface. For example, assume that the application designer wants to create an application that implements button B1 as an instance of a CoolButton class provided by a third party, where the CoolButton class does not implement the IView interface. Under these circumstances, the application designer (1) declares a subclass of CoolButton that implements the IView interface, and (2) specifies the implementations of each of the methods of the IView interface. The following is an example of how a button class MyButton, which is a subclass that implements the IView interface, may be declared:

```
public class MyButton
    extends CoolButton
    implements IView
{
    [implementations of IView methods]
}
```

The "implementations of the IView methods" generally convert calls made through the IView interface to calls made through the interface supported by CoolButton. For example, in one embodiment, the method setproperty(id, value) of the IView interface is used to set all properties of a view. Thus, a call to set the label of a button through the IView interface would have the form setProperty(Label, value). Similarly, a call to set the color of a button through the IView interface would have the form setProperty(Color, value). However, the CoolButton class may implement a method "setText(value)" to set the label of a button, and a method "setColor(value)" to set the color of a button. Under these conditions, the implementation provided by the MyButton class for the setProperty method of the IView interface may be, for example:

```
setProperty(id, value)
{
switch(id)
case Label:
    {
    MyButton.setText(value);
    break;
    }
case Color:
    {
    MyButton.setColor(value);
    break;
    }
}
```

Thus, a call through the IView interface to setProperty is converted to a call to setText when the id value passed to setProperty is "label", and is converted to a call to setColor when the id value passed to setProperty is "color".

ALTERNATIVE EMBODIMENTS

For the purpose of explanation, embodiment-specific details have been included in the foregoing description. However, those details are not required to practice the invention, and are not intended to limit the invention in any way. For example, the invention may be practiced using alternative embodiments, some of which shall now be described.

In the embodiment described above, all component implementations present the same interface to message handlers. However, in alternative embodiments, all user-specified class implementations for each given component type support the same interface as the default class implementation of the given component type, but those interfaces may differ for different types of components. For example, a user-specified class implementation for a button would implement the same interface as the default class implementation for buttons (and therefore be able to function properly with the button message handler), and a user-specified class implementation for a check box would implement the same interface as the default class implementation for a check box (and therefore be able to function properly with the check box message handler). However, the interface for the button implementations could be different from the interface for the check box implementations.

In the embodiments described above, UI components (e.g. buttons and check boxes) where given as examples of the types of components made available to a 4GL programmer, and for which the 4GL programmer is now able to specify non-default implementations. However, UI components are merely one type of component provided by 4GL programming tools. Other types of components include, for example, components that represent data sources. Using the techniques described herein, a 4GL programming tool may be provided that allows users to specify non-default implementations for any type of application component, including those that are not visibly part of the application's user interface. Similarly, the components for which 4GL programmers may specify non-default implementation classes may be components that execute on the server-side, as well as components that execute on the client-side.

HARDWARE OVERVIEW

Figure 2:
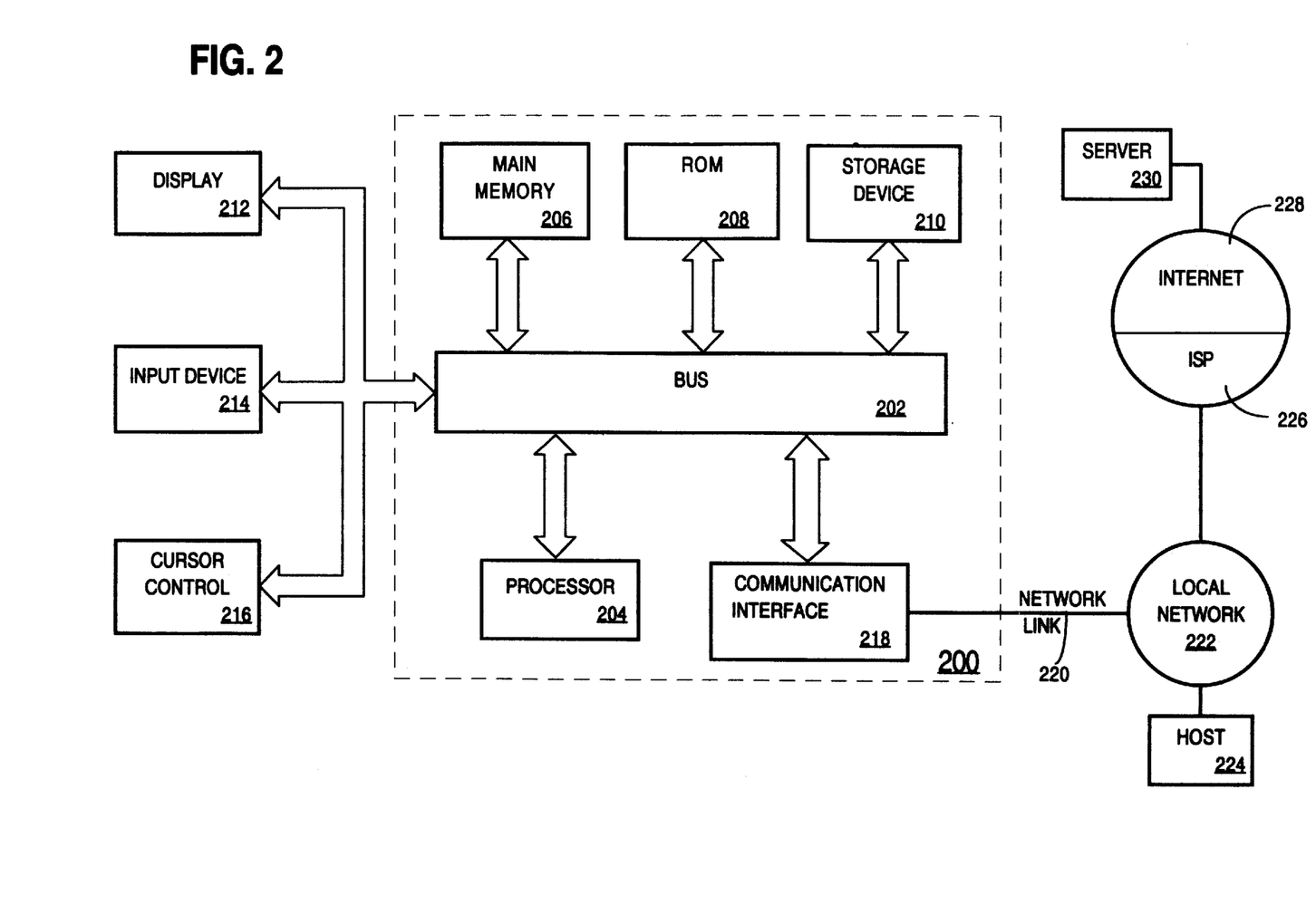
FIG. 2 is a block diagram illustrating a computer system upon which embodiments of the present invention may be implemented.

FIG. 2 is a block diagram that illustrates a computer system 200 upon which an embodiment of the invention may be implemented. Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of computer system 200 for designing 4GL applications. According to one embodiment of the invention, a 4GL programming tool that allows application programmers to specify non-default implementations of component classes is provided by computer system 200 in response to processor 204 executing one or more sequences of one or more instructions contained in main memory 206. Such instructions may be read into main memory 206 from another computer-readable medium, such as storage device 210. Execution of the sequences of instructions contained in main memory 206 causes processor 204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 204 for execution. Such a medium may take many forms, including but not limited to, non-volatile media, volatile media, and transmission media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electro-magnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218. In accordance with the invention, one such downloaded application provides for a 4GL programming tool as described herein.

The received code may be executed by processor 204 as it is received, and/or stored in storage device 210, or other non-volatile storage for later execution. In this manner, computer system 200 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for executing an application designed by a 4GL programming tool, the method comprising the steps of:
   reading, from application code generated by the 4GL programming tool, a portion of said application code that
   a) identifies a component for the application, wherein the component is of a particular component-type for which the 4GL programming tool provides a first implementation; and
   b) identifies a second implementation for the component that is different from said first implementation and that is not an implementation provided by said 4GL programming tool;
   executing said portion of said application code by calling a constructor implemented in said second implementation to create the component within the application.

2. The method of claim 1 wherein:
   the step of reading is performed by a runtime engine residing on a server; and
   the step of calling the constructor is performed on a client in response to receipt at said client of a message generated by said runtime engine in response to executing said portion of said application code.

3. The method of claim 2 wherein:
   the first implementation and the second implementation both support a common interface; and
   the step of calling the constructor is performed through said common interface by a message handler for said particular component-type.

4. The method of claim 1 wherein:
   the 4GL programming tool generates said portion of the application code in response to
   an application programmer entering input that specifies that said application is to have a component of said particular component-type; and
   said application programmer entering input that specifies that said component is to be implemented using said second implementation.

5. The method of claim 1 wherein:
the runtime engine executes said portion of said application code by sending a message to a dispatcher;
the dispatcher responds to the message by instantiating a message handler for said particular component-type; and
the message handler invokes said constructor.

6. The method of claim 5 wherein:
the runtime engine is on a server;
the dispatcher is on a client operatively coupled to said server over a network; and
the runtime engine sends the message to the dispatcher over said network.

7. The method of claim 1 further including the steps of:
reading, from application code generated by the 4GL programming tool, a second portion of said application code that
   a) identifies a second component for the application, wherein the second component is of a second particular component-type for which the 4GL programming tool provides a third implementation, wherein the second component-type is different from said first particular component-type; and
   b) identifies a fourth implementation for the second component that is different from said third implementation;
executing said second portion of said application code by calling a constructor implemented in said fourth implementation to create the second component within the application.

8. The method of claim 7 wherein said first, second, third and fourth implementations all implement a common interface.

9. A method for use in a system that includes a 4GL programming tool that allows application designers to create, through interaction with user interface objects and controls presented by the 4GL programming tool, applications that contain components that belong to a set of component-types for which implementations are provided by the 4GL programming tool, the method comprising the steps of:
   the 4GL programming tool providing a control for receiving data that indicates a user-specified implementation for a component of an application being designed using said 4GL programming tool;
   wherein said component is an instance of a component-type that belongs to said set of component-types;
   wherein said user-defined implementation is not one of said implementations provided by the 4GL programming tool;
   the 4GL programming tool generating application code that, when executed, runs said application; and
   wherein a portion of said application code indicates that said component is to be implemented using said user-specified implementation.

10. The method of claim 9 wherein said control is one of a plurality of controls on a property palette for receiving user-specified values for a plurality of properties of said component.

11. The method of claim 9 wherein the step of generating application code includes generating application code that is interpreted by a runtime engine to execute said application.

12. The method of claim 11 wherein:
the implementations provided by the 4GL programming tool for the set of component-types each support a common interface;
the user-specified implementation supports said common interface; and
during execution of the application, said component and any components implemented using the implementations provided by the 4GL programming tool are instantiated through calls made through said common interface.

13. A computer-readable medium carrying one or more sequences of instructions for executing an application designed by a 4GL programming tool, wherein execution of the one or more sequences of instructions by one or more processors causes the one or more processors to perform the steps of:
reading, from application code generated by the 4GL programming tool, a portion of said application code that
   a) identifies a component for the application, wherein the component is of a particular component-type for which the 4GL programming tool provides a first implementation; and
   b) identifies a second implementation for the component that is different from said first implementation;
executing said portion of said application code by calling a constructor implemented in said second implementation to create the component within the application.

14. The computer-readable medium of claim 13 wherein:
the step of reading is performed by a runtime engine residing on a server; and
the step of calling the constructor is performed on a client in response to receipt at said client of a message generated by said runtime engine in response to executing said portion of said application code.

15. The computer-readable medium of claim 14 wherein:
the first implementation and the second implementation both support a common interface; and
the step of calling the constructor is performed through said common interface by a message handler for said particular component-type.

16. The computer-readable medium of claim 13 wherein:
the 4GL programming tool generates said portion of the application code in response to
   an application programmer entering input that specifies that said application is to have a component of said particular component-type; and
   said application programmer entering input that specifies that said component is to be implemented using said second implementation.

17. The computer-readable medium of claim 13 wherein:
the runtime engine executes said portion of said application code by sending a message to a dispatcher;
the dispatcher responds to the message by instantiating a message handler for said particular component-type; and
the message handler invokes said constructor.

18. The computer-readable medium of claim 17 wherein:
the runtime engine is on a server;
the dispatcher is on a client operatively coupled to said server over a network; and
the runtime engine sends the message to the dispatcher over said network.

19. The computer-readable medium of claim 13 further including instructions for performing the steps of:
reading, from application code generated by the 4GL programming tool, a second portion of said application code that a) identifies a second component for the application, wherein the second component is of a second particular component-type for which the 4GL programming tool provides a third implementation, wherein the second component-type is different from said first particular component-type; and b) identifies a fourth implementation for the second component that is different from said third implementation;

executing said second portion of said application code by calling a constructor implemented in said fourth implementation to create the second component within the application.

20. The method of claim 19 wherein said first, second, third and fourth implementations all implement a common interface.

21. A computer-readable medium carrying instructions to implement a 4GL programming tool that allows application designers to create, through interaction with user interface objects and controls presented by the 4GL programming tool, applications that contain components that belong to a set of component-types for which implementations are provided by the 4GL programming tool, the computer-readable medium carrying instructions for performing the steps of:

the 4GL programming tool providing a control for receiving data that indicates a user-specified implementation for a component of an application being designed using said 4GL programming tool;

wherein said component is an instance of a component-type that belongs to said set of component-types;

wherein said user-defined implementation is not one of said implementations provided by the 4GL programming tool;

the 4GL programming tool generating application code that, when executed, runs said application; and wherein a portion of said application code indicates that said component is to be implemented using said user-specified implementation.

22. The computer-readable medium of claim 21 wherein said control is one of a plurality of controls on a property palette for receiving user-specified values for a plurality of properties of said component.

23. The computer-readable medium of claim 21 wherein the step of generating application code includes generating application code that is interpreted by a runtime engine to execute said application.

24. The computer-readable medium of claim 23 wherein:

the implementations provided by the 4GL programming tool for the set of component-types each support a common interface;

the user-specified implementation supports said common interface; and during execution of the application, said component and any components implemented using the implementations provided by the 4GL programming tool are instantiated through calls made through said common interface.

* * * * *

UNITED STATES PATENT AND TRADEMARK OFFICE
CERTIFICATE OF CORRECTION

PATENT NO. : 6,560,770 B1
DATED : May 6, 2003
INVENTOR(S) : Sanjay Saxena and Christopher Harrison It is certified that error appears in the above-identified patent and that said Letters Patent is hereby corrected as shown below:

<u>Column 13,</u>
Line 1, replace "claim 1" with -- claim 2 --.

<u>Column 14,</u>
Line 49, replace "claim 13" with -- claim 14 --.

Signed and Sealed this

Twenty-second Day of February, 2005

JON W. DUDAS
*Director of the United States Patent and Trademark Office*